United States Patent

Stronczek

[11] Patent Number: 6,147,466
[45] Date of Patent: Nov. 14, 2000

[54] SYNCHRONIZATION SYSTEM FOR MOTORS

[75] Inventor: Steven J. Stronczek, Michigan City, Ind.

[73] Assignee: Commercial Vehicle Systems, Inc., Michigan City, Ind.

[21] Appl. No.: 09/223,114

[22] Filed: Dec. 30, 1998

[51] Int. Cl.$^7$ .................................. B60S 1/08; H02P 5/52
[52] U.S. Cl. ............................... 318/443; 318/41; 318/62; 318/85; 318/444; 318/DIG. 2
[58] Field of Search .................................. 318/440–469; 15/250.13, 250.16

[56] References Cited

U.S. PATENT DOCUMENTS

| | | |
|---|---|---|
| 3,601,839 | 8/1971 | Kato . |
| 3,649,898 | 3/1972 | Inoue . |
| 3,675,103 | 7/1972 | Elliott . |
| 3,676,589 | 7/1972 | Jetzt . |
| 3,721,878 | 3/1973 | Gumbert . |
| 3,919,613 | 11/1975 | Steinmann ............................... 318/443 |
| 4,225,951 | 9/1980 | Menin et al. . |
| 4,306,218 | 12/1981 | Leconte et al. . |
| 4,431,954 | 2/1984 | Carpenter et al. . |
| 4,475,642 | 10/1984 | Fritz . |
| 4,509,878 | 4/1985 | Bryson et al. . |
| 4,585,980 | 4/1986 | Gille et al. ............................... 318/444 |
| 4,642,649 | 2/1987 | Lightfoot . |
| 4,665,488 | 5/1987 | Graham et al. ........................... 318/444 |
| 4,670,695 | 6/1987 | Licata et al. ............................. 318/443 |
| 4,723,101 | 2/1988 | Bauer et al. .............................. 318/443 |
| 4,813,095 | 3/1989 | Sato . |
| 4,857,812 | 8/1989 | Mochizuki et al. . |
| 4,882,502 | 11/1989 | Kobayashi . |
| 4,900,995 | 2/1990 | Wainwright .............................. 318/443 |
| 4,900,996 | 2/1990 | Wainwright .............................. 318/443 |
| 4,956,591 | 9/1990 | Schierbeek et al. . |
| 4,987,636 | 1/1991 | Jenn-Chyou . |
| 5,005,248 | 4/1991 | Bonar . |
| 5,157,314 | 10/1992 | Kuhbauch ............................... 318/443 |
| 5,182,501 | 1/1993 | Henderson et al. ..................... 318/443 |
| 5,182,502 | 1/1993 | Slotkowski et al. . |
| 5,216,340 | 6/1993 | Welch ..................................... 318/443 |
| 5,245,259 | 9/1993 | Nakamura et al. ...................... 318/443 |
| 5,252,897 | 10/1993 | Porter et al. ............................ 318/443 |
| 5,256,950 | 10/1993 | Matsumoto et al. .................... 318/443 |
| 5,301,383 | 4/1994 | Suzuki . |
| 5,305,716 | 4/1994 | Hüttlin . |
| 5,306,991 | 4/1994 | Suzuki . |
| 5,329,206 | 7/1994 | Slotkowski et al. . |
| 5,355,061 | 10/1994 | Forhan . |
| 5,507,585 | 4/1996 | Diederich et al. . |
| 5,568,026 | 10/1996 | Welch ..................................... 318/443 |
| 5,654,616 | 8/1997 | Suriano et al. . |
| 5,757,155 | 5/1998 | Autran et al. ........................... 318/443 |

*Primary Examiner*—Paul Ip
*Attorney, Agent, or Firm*—Baker & Daniels

[57] ABSTRACT

A synchronization system according to the present invention includes a signal generator that provides a "RUN" signal simultaneously to two or more windshield wiper motors in response to simultaneous receipt of position signals generated by the motors. Each motor generates a position signal when the windshield wiper controlled by the motor is at a predetermined position. A gate circuit monitors the output of each motor to determine whether the motor is in the predetermined position. The gate circuit provides a trigger signal to the signal generator of the present invention only when each motor outputs a position signal. The trigger signal causes the signal generator to produce a subsequent "RUN" signal initiating another wipe cycle. Accordingly, the motors begin each cycle in synchronization.

78 Claims, 8 Drawing Sheets

SYNCHRONIZATION SYSTEM FOR MOTORS

FIELD OF THE INVENTION

The present invention generally relates to a control system for synchronizing the operation of motors, and more particularly to an electronic control system for synchronizing the operation of a pair of motors, each of which drive a windshield wiper on a vehicle.

BACKGROUND AND SUMMARY OF THE INVENTION

For various reasons, large vehicles typically use two independently operating windshield wiper motors to drive the vehicle windshield wipers. Driver fatigue and distraction is caused by unsynchronized operation of these motors. Accordingly, it is desirable to control the operation of the motors such that the windshield wiper blades driven by the motors move in unison across the windshield.

The present invention provides a synchronization system for motors which includes a synchronizer that provides a "RUN" signal of a predetermined duration simultaneously to a pair of motors, for example, windshield wiper motors, in response to receipt of position signals corresponding to the angular orientation of the windshield wipers connected to the motors. In one embodiment of the invention, each windshield wiper motor generates a position signal when the windshield wiper is in a "park" position at the bottom of its stroke. The "park" position is substantially arbitrary, and a position signal may be generated when the wipers are at the top or center of the stroke. These position signals are provided to an electronic circuit which generates a trigger signal when a "PARK" position signal from each of the motors is present. The trigger signal is not generated, and a subsequent "RUN" signal is not produced, when only one motor has returned to the "park" position. Thus, the first motor to reach the "park" position (i.e., the first motor to cause the generation of a "PARK" position signal), is maintained in the "park" position until the other motor reaches its "park" position and causes the generation of a "PARK" position signal. Once generated, the trigger signal is provided to a signal generator within the synchronizer which outputs a "RUN" signal having a predetermined duration which is sufficient to move the motors off of the "park" position to begin another wipe cycle. Various control signals are provided by the operator through switches to the synchronization system. These signals facilitate adjustment of, among other things, the speed of the motors' operation and the frequency of the wipe cycles.

Other features of the present invention will become apparent upon consideration of the following description of embodiments of the invention in conjunction with the accompanying drawings.

DESCRIPTION OF EMBODIMENTS OF THE INVENTION

The embodiments described herein are not intended to be exhaustive or to limit the invention to the precise forms disclosed. Rather, the embodiments selected for description are described to permit those skilled in the art to utilize their teachings.

Figure 1:
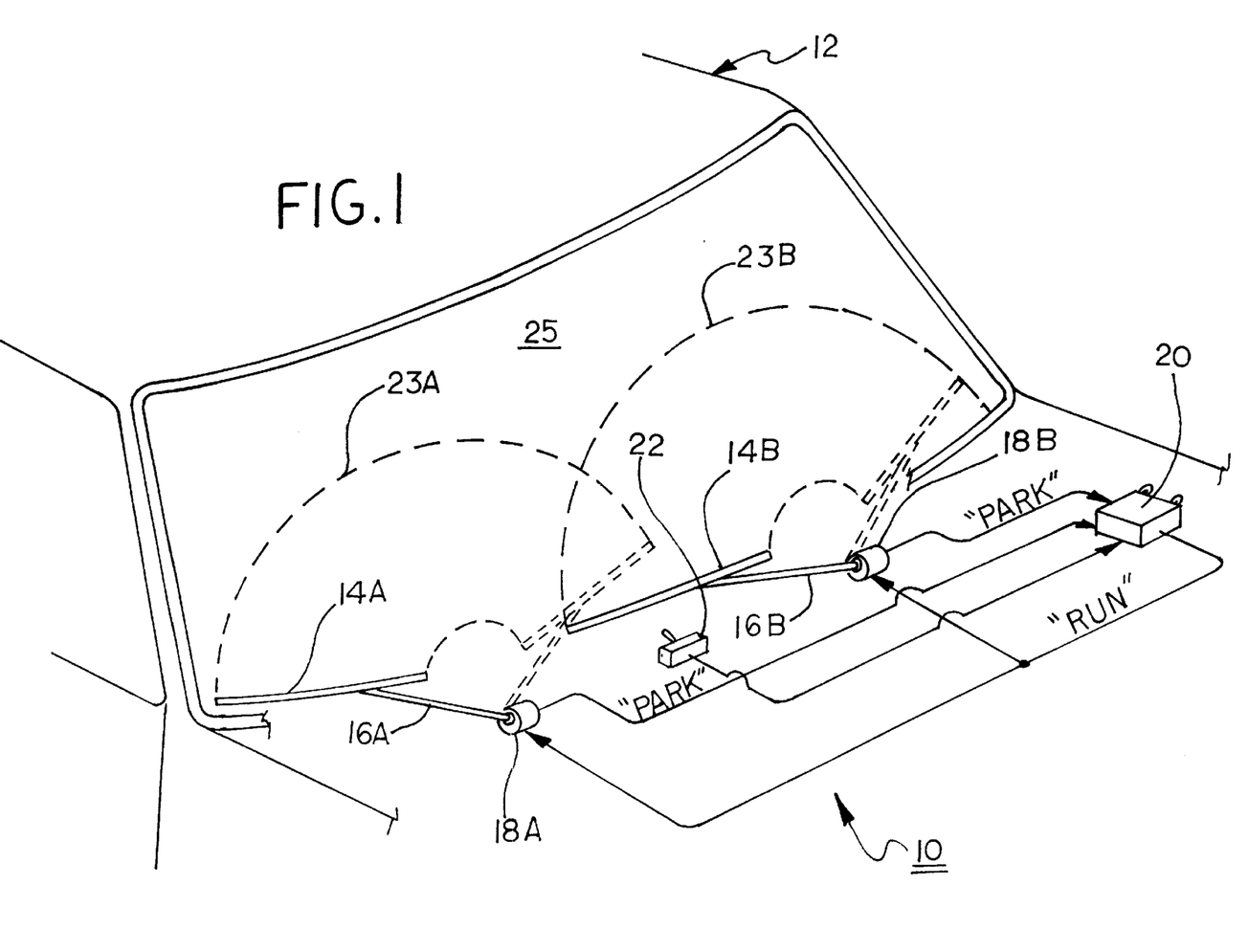
FIG. 1 depicts a synchronization system according to the present invention mounted to a vehicle for use with windshield wiper motors.

FIG. 1 shows the synchronization system or synchronizer 10 according to the present invention mounted to a vehicle 12 for use in controlling the operation of windshield wiper motors 18a, 18b. System 10 is connected to motors 18a, 18b which are connected through linkages 16a, 16b to a pair of windshield wipers 14a, 14b. Of course, linkages 16a, 16b may take a variety of forms and are merely depicted to suggest a mechanical connection between motors 18a, 18b and windshield wipers 14a, 14b.

Each motor 18a, 18b provides a predetermined position signal (in an exemplary embodiment, designated the "PARK" signal) to the control electronics of synchronizer 10 housed within enclosure 20 which is mounted to vehicle 12. Similarly, the control electronics of synchronizer 10 are connected from enclosure 20 to motors 18a, 18b to provide a "RUN" signal to each motor. A function selector switch 22 is mounted to vehicle 12 such that an operator or a passenger of vehicle 12 may manually change the position of the switch to affect the operation of synchronizer 10.

As will be explained in greater detail below, synchronizer 10 ensures that windshield wipers 14a, 14b move in a substantially synchronized fashion through their respective arcuate wiping paths 23a, 23b across vehicle windshield 25 between a "park" position (shown in dotted lines in FIG. 1) and a "reversal" position (shown in solid lines in FIG. 1). As mentioned above, the "park" position could be defined as any preselected position within arcuate wiping paths 23a, 23b.

Figure 6:
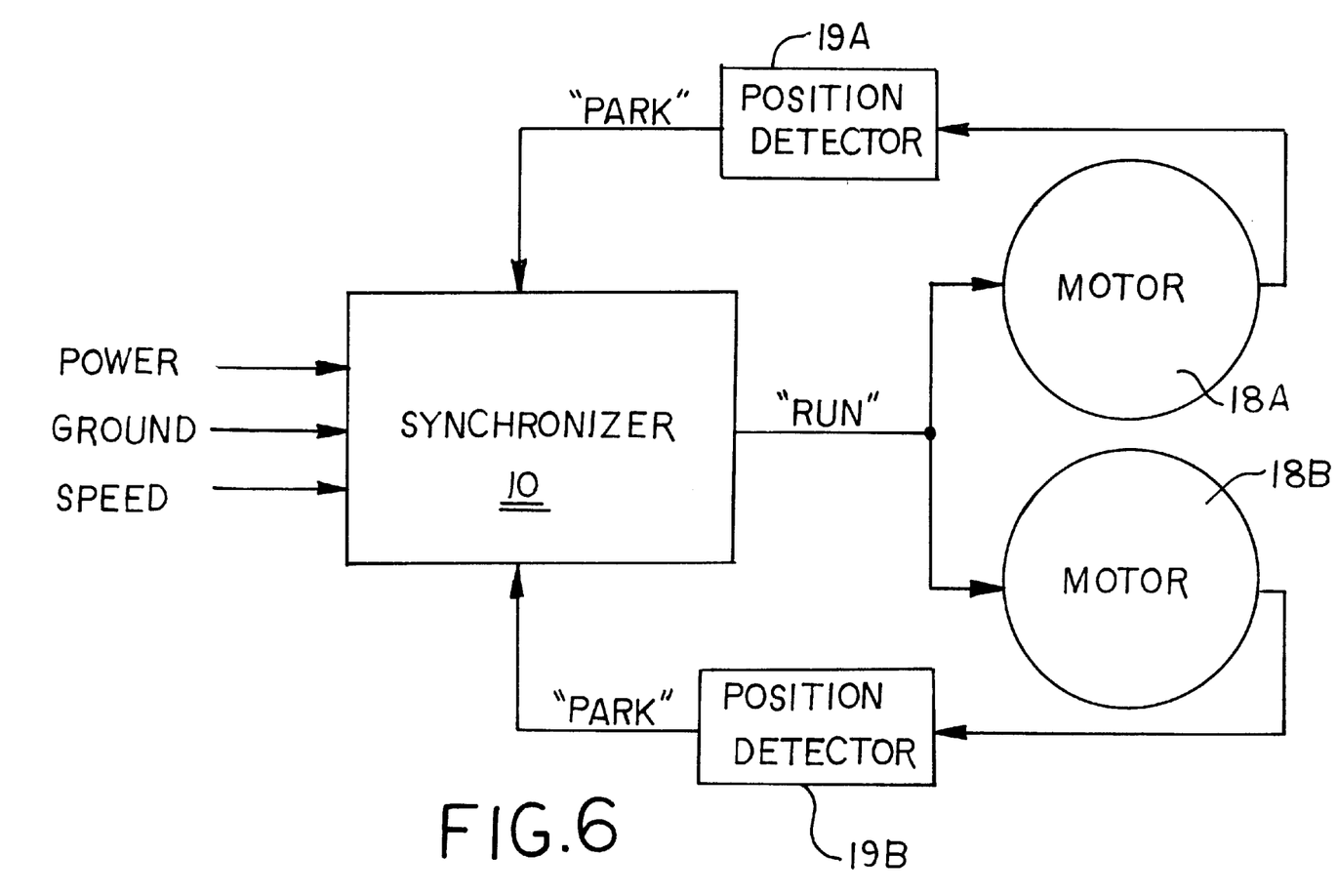
FIG. 6 is a block diagram of a synchronization system according to the present invention.

FIG. 6 shows a general block diagram representation of the synchronization system of the present invention. Synchronizer 10 provides a "RUN" signal to simultaneously initiate one cycle of operation of motors 18a, 18b. Position detectors 19a, 19b sense the position of motors 18a, 18b within their respective cycles of operation. When each motor 18a, 18b reaches a predetermined position within its operation cycle, its respective position detector 19a, 19b produces a "PARK" signal which is provided to synchronizer 10. The motor then remains in the predetermined position until it receives another "RUN" signal. Synchronizer 10 produces a "RUN" signal only upon sensing the simultaneous presence of a "PARK" signal corresponding to each of the motors 18a, 18b. Once this condition is met, synchronizer 10 produces another "RUN" signal which is simultaneously provided to motors 18a, 18b. Power, ground, and speed control are provided to synchronizer 10 through external circuitry.

Figure 2:
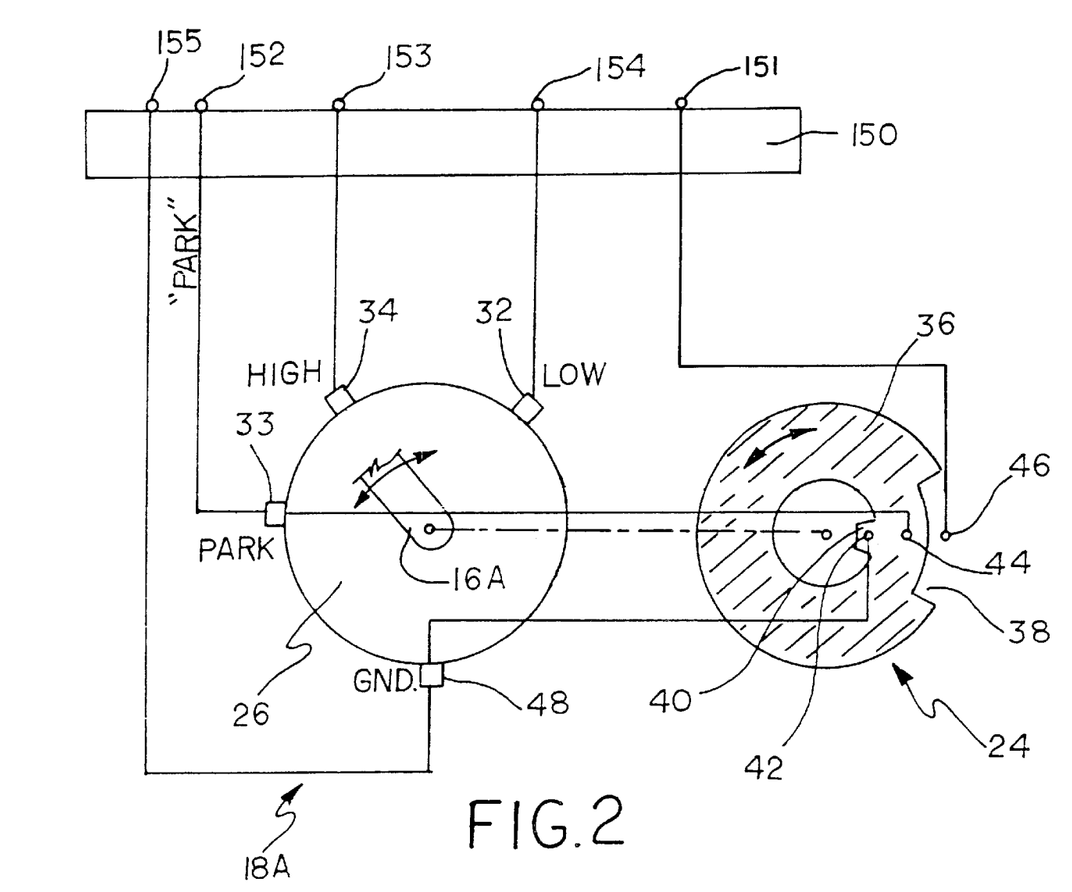
FIG. 2 is a schematic diagram of a motor compatible for use with the synchronization system of the present invention.

Referring now to FIG. 2, one embodiment of the present invention operates in cooperation with motors 18a, 18b which are manufactured by SWF, a Division of ITT (for example, model numbers K, 2K, L, and 2L). Since the structure and operation of motors 18a, 18b are the same, for simplicity, only one is described herein. Motor 18a includes a parking disk 24 which is mechanically connected in a conventional manner (indicated by broken line) to an armature 26 that drives linkage 16a (FIG. 1). As is described in greater detail below, the position of function selector switch 22 determines whether high or low power signals are provided to motor 18a through I/O port 150 to ultimately control the speed of operation of motor 18a.

Parking disk 24 includes a main body 36, a notch 38, and an interior projection 40. Electrical contacts 42, 44, and 46 are placed in proximity to parking disk 24 to make electrical contact with disk 24 depending upon the angular position of the disk. Contact 42 engages interior projection 40 of disk 24 when the disk is in the position shown in FIG. 2. Contact 42 is connected through the ground input 48 of armature 26 to node 155 of I/O port 150, which is connected to system ground. Contact 44 remains in contact with main body 36 of disk 24, regardless of the angular position of the disk. Contact 46 provides an electrical connection to main body 36 when disk 24 is rotated such that notch 38 is angularly offset from contact 46. Main body 36 and interior projection 40 of disk 24 are made of or coated with an electrically conductive material so that contact 42 is electrically connected to contact 44 when disk 24 is in the position shown in FIG. 2, and contact 46 is electrically connected to contact 44 when the disk is rotated such that contact 46 is in contact with main body 36. It should be apparent that the relative orientation of projection 40 and notch 38, coupled with the fixed orientation of contacts 42, 44, and 46, ensures that contacts 42 and 46 are never simultaneously electrically connected to contact 44.

Contact 44 is connected through the "PARK" output 33 of armature 26 to node 152 of I/O port 150. As will be described in greater detail below, motor 18a provides a "PARK" signal (as a position signal) to indicate that wiper 14a connected to motor 18a is in the "park" position. Contact 46 connects to model 51 of I/O port 150. Low input 32 and high input 34, are connected to nodes 153 and 154, respectively.

Figure 3:
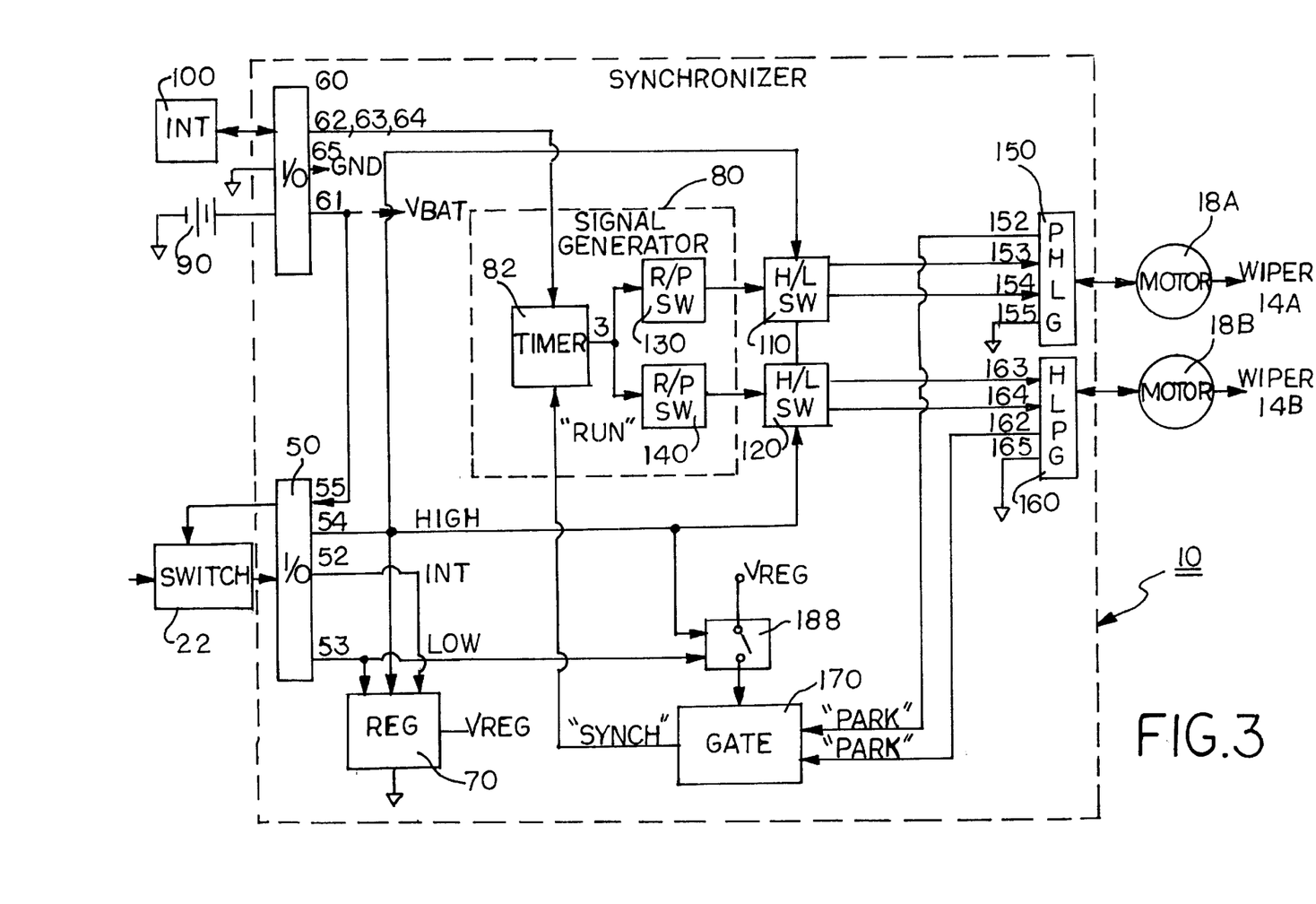
FIG. 3 is a block diagram of a synchronization system according to the present invention.

FIG. 3 shows, in block diagram form, the control electronics of system 10. Function selector switch 22, which is manually controlled by the operator, is connected through I/O port 50 (nodes 52, 53, 54) to regulator circuit 70, signal generator 80 and high/low switches 110, 120. I/O port 60 receives a power input (Vbat) from the vehicle battery 90 and a wiper intermittent selection input from intermittent time select circuit 100, which is a sub-circuit of signal generator 80. An intermittent wiper signal is routed from I/O port 60 (nodes 62, 63, 64) to signal generator 80. I/O port 60 (node 61) provides Vbat to various components of system 10 including function selector switch 22 through I/O port 50 (node 55). Similarly, regulator circuit 70 provides a Vreg signal, which is regulated to a standard 5-volt level, to various electrical components of system 10.

Signal generator 80 outputs a "RUN" signal to run/park switches 130, 140, which in turn cause power to be applied to motors 18a, 18b through high/low switches 110, 120 and I/O ports 150, 160, respectively. High/low switches 110, 120 route the appropriate voltage signal to the power inputs (high input 34 or low input 32) of motors 18a, 18b through I/O ports 150, 160 (at nodes 153, 154 of I/O port 150 and nodes 163, 164 of I/O port 160). As previously indicated, motors 18a, 18b output a "PARK" signal when wipers 14a, 14b are in the "park" position. These "PARK" signals are directed from the "park" outputs 33 of armatures 26 through I/O ports 150, 160 (nodes 152, 162) to a gate circuit 170. As will be described below, under appropriate conditions when both motors 18a, 18b are in a "park" position, gate circuit 170 outputs a trigger signal or "SYNCH" signal to a timer 82 within signal generator 80 which generates a "RUN" signal as described above.

Figure 4:
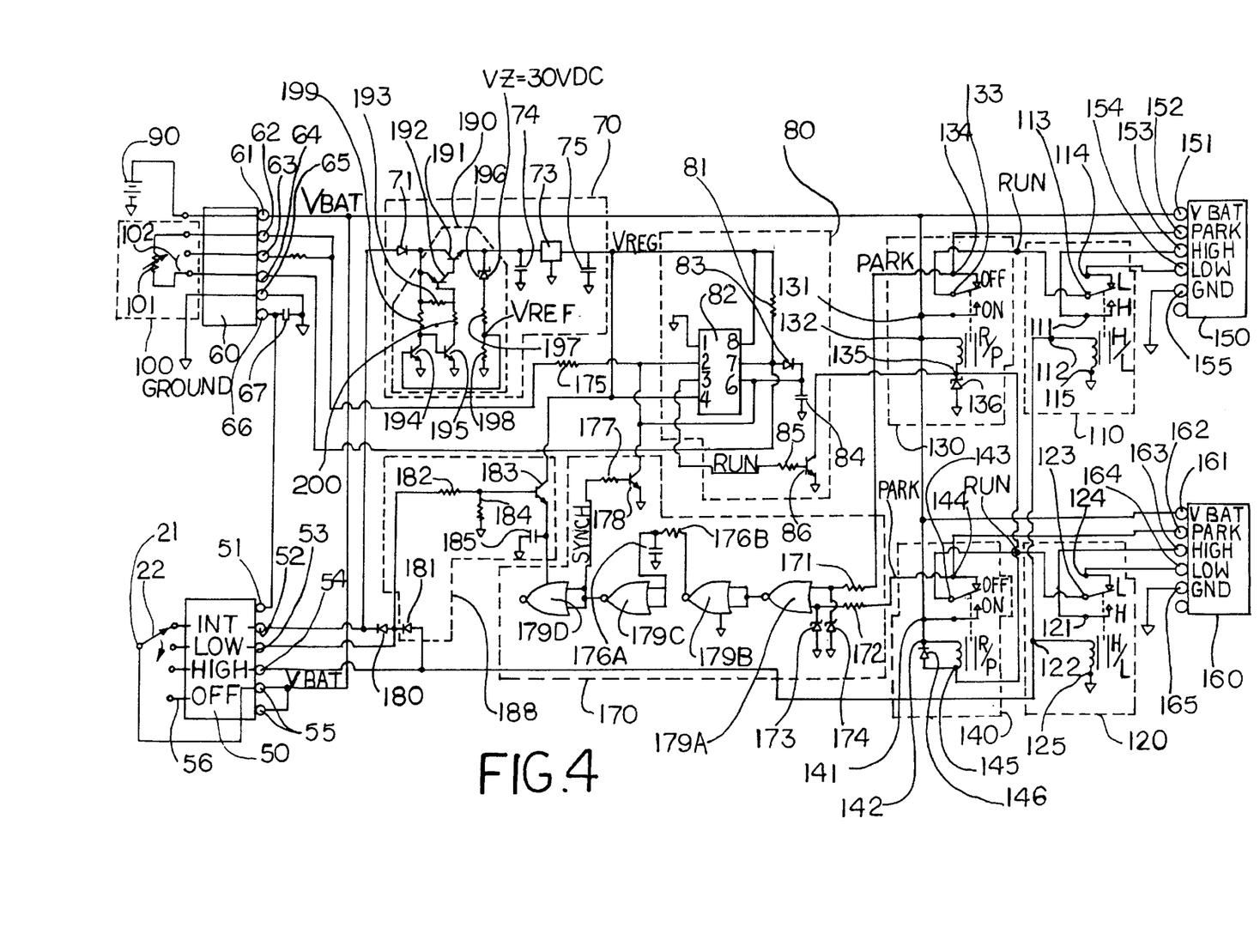
FIG. 4 is an electrical schematic of an embodiment of the synchronization system of FIG. 3.

Referring now to FIG. 4, I/O port 50 includes nodes 51 through 55. Node 55 is connected to Vbat at node 61 of I/O port 60 and the common node 21 of function selector switch 22. Function selector switch 22, which is a dash or steering column mounted four-position switch, switches Vbat power between four selectable positions. Nodes 52, 53, 54, and 56 of I/O port 50 are connected to the intermittent, low speed, high speed, and off outputs of function selector switch 22, respectively. Node 51 of I/O port 50 is connected to node 66 of I/O port 60 which provides a "wash" signal to a conventional windshield washing device (not shown). A decoupling capacitor 67 is connected between node 66 of I/O port 60 and system ground, which is routed to synchronizer 10 at node 65 of I/O port 60.

Intermittent time select circuit 100 includes a potentiometer 101 connected between nodes 62 and 64 of I/O port 60, and a jumper 102 which is optionally connected between nodes 63 and 64. When function selector switch 22 is switched to intermittent node 52, jumper 102, if installed, reconfigures signal generator 80 to operate in the intermittent astable mode by preventing transistor 183 from supplying Vreg to gate circuit 170. If jumper 102 is not installed, signal generator 80 remains in the monostable, one-shot mode.

Vbat is provided through node 61 of I/O port 60 to node 55 of I/O port 50, node 151 of I/O port 150, node 161 of I/O port 160, and run/park switches 130, 140.

Regulator circuit 70 receives its power input from I/O port 50. Node 52 is connected to the cathode of diode 180 and the anode of diode 71. Node 53 of I/O port 50 is connected to the anode of diode 180, the cathode of diode 181, and resistor 182. Node 54 of I/O port 50 is connected to the anode of diode 181, and high/low switches 110, 120. Resistor 182 is connected to the base of transistor 183, which is also connected to resistor 184, the other side of which is connected to ground. The collector of transistor 183 receives Vreg power from regulator circuit 70. The emitter of transistor 183 is connected to the power input of gate circuit 170 as well as bypass capacitor 185. Transistor 183 is configured as a switch which switches power to gate circuit 170 and reconfigures signal generator 80 to operate in the monostable mode (one shot, synchronous operation) rather than the astable mode (free running, intermittent operation).

Regulator circuit 70 includes diode 71, load dump protection circuit 190, voltage regulator 73, and capacitors 74, 75. Regulator circuit 70 protects the internal circuits of synchronizer 10 from load dump transients present in a vehicle when the vehicle battery is removed while the alternator of the vehicle is charging. A large energy spike of as much as seven volts is transmitted to the vehicle Vbat bus under such conditions.

Supply current enters load dump protection circuit 190 of regulator circuit 70 through diode 71. Diode 71 prevents all negative going transient energy from entering regulator circuit 70. The components of load dump protection circuit 190 are preferably selected for fast operating times. Transistor 191 is biased on by transistor 192 and resistor 193. When Vref (the junction between resistors 197 and 198) exceeds a preselected value, such as when a spike occurs, current is applied from the Vref node to the base of transistor 194. Transistor 194 thus connects the base of transistor 195 to ground, thereby preventing current flow through transistor 195 and causing a logic high to appear at the base of transistor 192. A logic high at the base of transistor 192 shuts off transistor 191 so long as the spike condition exists, thereby preventing the spike from passing to voltage regulator 73.

Vref is set by zener diode 196 and the resistor divider network formed by resistors 197 and 198. In the embodiment shown, the breakdown voltage of zener diode 196 is approximately 30 volts DC. Therefore, any spike over approximately 32.1 volts DC will be prevented from entering voltage regulator 73.

The input to regulator 73 is connected to the emitter of transistor 191, the cathode of zener diode 196, and the high side of capacitor 74. As previously mentioned, the output of regulator 73 (Vreg) is connected to the collector of transistor 183. Vreg is also connected to the high side of capacitor 75, and signal generator 80 at resistor 81 and pins 4 and 8 of timer 82 (for example, a standard 555 timer). The low sides of capacitor 74 and 75 are connected to ground.

Signal generator 80 also includes diode 83, capacitor 84, resistor 85, and drive transistor 86. Resistor 81 is connected to the anode of diode 83, timer 82 (pin 7) and node 64 of I/O port 60. The cathode of diode 83 is connected to the high side of capacitor 84, timer 82 (pins 6 and 2), gate circuit 170, and resistor 175. The low side of capacitor 84 is connected to ground. The output of timer 82 (pin 3) (the "RUN" signal) is connected through line resistor 85 to the base of drive transistor 86. The collector of transistor 86 is connected to run/park switches 130, 140. The emitter is connected to ground.

Run/park switches 130, 140 and high/low switches 110, 120 are in this embodiment, standard relays, such as 572 or 582 series relays manufactured by Fujitsu/Takamisawa. Vbat is provided to run/park switch 130 at "on" node 131 and coil input 132, and to run/park switch 140 at "on" node 141 and coil input 142. Coil input 142 is also connected to the cathode of spike protection diode 146. Common node 133 of run/park switch 130 is connected to the common node 113 of high/low switch 110. The "off" node 134 of run/park switch 130 is connected to the "park" node 152 of I/O port 150 and one side of resistor 171 of gate circuit 170. The coil output 135 of run/park relay 130 is connected to spike protection diode 136 (which is connected to ground), the collector of drive transistor 86, coil output 145 of run/park switch 140, and the anode of spike protection diode 146.

The common node 143 of run/park switch 140 is connected to the common node 123 of high/low switch 120. The "off" node 144 of run/park switch 140 is connected to "park" node 162 of I/O port 160 and resistor 172 of gate circuit 170.

The "high" node 111 of high/low switch 110 is connected to "high" node 153 of I/O port 150. The coil input 112 is connected to the coil input 122 of high/low switch 120, the anode of diode 181, and node 54 of I/O port 50. The "low" node 114 of high/low switch 110 is connected to the "low" node 154 of I/O port 150. Coil outputs 115 and 125 of high/low switches 110 and 120, respectively, are connected to ground.

The "high" node 121 of high/low switch 120 is connected to the "high" node 163 of I/O port 160. The "low" node 124 is connected to the "low" node 164 of I/O port 160. Nodes 155 and 165 of I/O ports 150 and 160, respectively, are connected to ground.

Gate circuit 170 includes current limiting input resistors 171, 172, zener diodes 173, 174, dwell capacitor 176*a*, dwell resistor 176*b*, base resistor 177, transistor 178, and NOR gates 179*a, b, c, d*, which are cascaded together to provide a logic "AND" configuration. According to DeMorgan's equivalence, a positive logic "NOR" gate is a negative logic "NAND" gate. Only three of the four "NOR" gates (i.e., 179*a*, 179*b*, and 179*c*) are necessary in this embodiment. The cascaded configuration of these three gates provides a park dwell time. As is explained below, the park dwell time is controlled by the value of capacitor 176*a* and resistor 176*b*.

Zener diodes 173, 174 limit the input voltage to gate 179*a* inputs to 5 volts DC, even when the "PARK" signals from motors 18*a*, 18*b* are at the higher Vbat potential. Current limiting resistor 171 of gate circuit 170 is connected to the cathode of zener diode 174 and an input of "NOR" gate 179*a*. Similarly, current limiting resistor 172 is connected to the cathode of zener diode 173 and the other input of "NOR" gate 179*a*. The anodes of both diodes 173, 174 are connected to ground. The combination of resistor 171 and diode 174, and resistor 172 and diode 173, condition the "PARK" signals received from I/O ports 150, 160 to the appropriate 5 volts DC logic voltage level for application to "NOR" gate 179*a*. Gate 179*a* is in a negative logic "AND" gate configuration. Its output is provided to second stage "NOR" gate 179*b* which is configured as an inverter. The output of gate 179*b* is then passed through the RC network including dwell capacitor 176*a* and dwell resistor 176*b*. This RC network provides short-term noise immunity against noise generated by motors 18*a*, 18*b*. The values of dwell resistor 176*b* and dwell capacitor 176*a* provide a time constant (typically configured for a 50 millisecond dwell time) which causes the faster of motors 18*a*, 18*b* to dwell in the "park" position as described in greater detail below. The dwell time is selected to permit the dynamic park current to fully dissipate, thereby lengthening the useful life of run/park switches 130, 140.

The output of "NOR" gate 179*b* is provided through the RC network of dwell resistor 176*b* and dwell capacitor 176*a* to a second inverting "NOR" gate 179*c* which converts the gated "PARK" signals into the proper polarity. The output of gate 179*c* is connected through base resistor 177 to the base of transistor 178. The collector of transistor 178 is connected to the high side of capacitor 84, one side of resistor 175, the cathode of diode 83, and timer 82 (pins 2 and 6). The circuitry included in gate circuit 170 is just one example of electronics capable of performing the gating and synchronization functions of the present invention.

Referring now to FIG. 6, the basic function of synchronizer 10 is to provide a "RUN" signal simultaneously to motors 18*a*, 18*b* of sufficient duration to cause parking disks 24 to rotate off of the "park" position shown in FIG. 2. As armatures 26 drive parking disks 24 through a 360 degree rotation, synchronizer 10 monitors the outputs of motors 18*a*, 18*b* to determine the status of the "PARK" signals. The position indicating function of parking disks 24 is depicted in FIG. 6 as position detectors 19*a*, 19*b*. When both motors have again reached the "park" position (i.e., after the faster motor, if any, has dwelled in the "park" position until the slower motor has reached the "park" position), synchronizer 10 generates a subsequent "RUN" signal to energize the motors through another wipe cycle. Each wiper 14*a*, 14*b* will begin each wipe cycle in unison, even if one wiper completes the previous wipe cycle before the other wiper.

Referring again to FIG. 3, power from battery 90 is routed to the above-identified locations on synchronizer 10 through I/O port 60. Vbat power is also provided through switch 22 and I/O port 50 (at nodes 52, 53 or 54) to regulator circuit 70 where it is converted to Vreg power. The high power signal and low power signal are provided to power switch 188 (consisting of the components shown in FIG. 4) and, when applied, cause switch 188 to close, thereby providing Vreg power to gate circuit 170. The high power signal, when selected, also causes high/low switches 110, 120 to apply Vbat to the high inputs 34 of motors 18a, 18b when a "RUN" signal is generated by signal generator 80. When the intermittent wiper speed is provided by switch 22, Vbat power is provided to regulator 70 (through node 52 of I/O port 50) and the asynchronous, free-running operation of signal generator 80 is controlled by intermittent time select circuit 100. Power switch 188 remains opened, and Vreg power is not applied to gate circuit 170.

Once the speed of the motors 18a, 18b has been selected, high/low switches 110, 120 are either energized or de-energized to provide the appropriate high speed or low speed power signal to motors 18a, 18b through I/O ports 150, 160, respectively. Signal generator 80 is enabled by either the "SYNCH" signal from gate circuit 170 or the intermittent time select circuit 100 to provide a limited duration "RUN" signal to run/park switches 130, 140. Run/park switches 130, 140 then route Vbat power through high/low switches 110, 120. When the high speed power signal is selected at function selector switch 22, high/low switches 110, 120 provide Vbat power to high inputs 34 of armatures 26 (through nodes 153, 163 of I/O ports 150, 160, respectively) in response to a "RUN" signal. When the low speed power signal is selected, high/low switches 110, 120 provide Vbat power to low inputs 32 of armatures 26 in response to a "RUN" signal. As will be explained in greater detail below, the limited duration "RUN" signal (and the resulting application of power to either high inputs 34, or low inputs 32) causes armatures 26 of motors 18a, 18b to move parking disks 24 off of the "park" position. The motors rotate through a 360 degree wipe cycle, which is converted by linkages 16a, 16b to movement of wipers 14a, 14b through arcuate wiping paths 23a, 23b from the "park" position, to a "reversal" position, and back to the "park" position. When wipers 14a, 14b return to the "park" position, motors 18a, 18b provide a "PARK" signal (through nodes 152 and 162 of I/O ports 150 and 160, respectively) to gate circuit 170. When both "PARK" signals are present at gate circuit 170, the "SYNCH" signal is provided to signal generator 80 which again generates a "RUN" signal to commence another synchronous wipe cycle.

The operation of synchronizer 10 is best understood through the description of a sample wipe cycle.

A wipe cycle is initiated when switch 22 (FIG. 3) is switched into the low speed position, the high speed position, or the intermittent position. For purposes of this example, assume that the operator has positioned function selector switch 22 to select low speed operation. By moving function selector switch 22 to a low speed position, the operator connects Vbat at node 55 of I/O port 50 through function selector switch 22 to node 53 of I/O port 50. Unless function selector switch 22 is in the "off" position, Vbat power is provided to regulator circuit 70 through one of nodes 52, 53, or 54 of I/O port 50. As such, regulator circuit 70, including load dump protection circuit 190, converts Vbat power to Vreg power as described above. When low speed operation is selected, the low speed power signal from node 53 of I/O port 50 also activates power switch 188, thereby routing Vreg power to gate circuit 170. More specifically, Vbat power from node 53 is applied to resistor 182 of power switch 188 which forms a voltage divider circuit with resistor 184, creating a sufficient voltage between the two resistors to enable transistor 183. Since Vreg power is provided to the collector of transistor 183, when enabled, transistor 183 supplies Vreg power to quad "NOR" gates 179a, b, c, d of gate circuit 170.

Regulator 70 also supplies Vreg power to timer 82 of signal generator 80 and charges capacitor 84 through resistor 81 and diode 83 (FIG. 4). When transistor 183 is enabled, timer 82 of signal generator 80 provides a "RUN" signal from pin 3 for a duration of time corresponding to the time required for capacitor 84 of the RC network consisting of resistor 81 and capacitor 84 to charge.

Referring now to FIG. 4, the "RUN" signal from timer 82 is provided to resistor 85 which enables drive transistor 86, thereby providing a path to ground for coil outputs 135, 145 of run/park switches 130, 140, respectively. Since both switches 130, 140 are directly connected to Vbat power at coil inputs 132, 142, the path to ground provided by drive transistor 86 energizes both switches 130, 140. Switches 130, 140 are used to isolate the parking circuit of one motor 18a, 18b from that of the other motor. As should be apparent to one skilled in the art, other types of isolation devices could be used, for example, optoisolators. Common nodes 133, 143 are, therefore, switched from their normally "off" position (i.e., the position shown in FIG. 4) to their "on" position wherein common nodes 133, 143 are connected to "on" nodes 131, 141, respectively. Accordingly, Vbat power is provided from switch 130 through common node 131 to common node 113 of high/low switch 110. Likewise, common node 143 of switch 140 routes Vbat to common node 123 of high/low switch 120. Since high/low switches 110, 120 are only energized when function selector switch 22 is switched into the high speed position (i.e. connecting Vbat from node 55 of I/O port 50 to node 54 of I/O port 50), Vbat power from the run/park switches 130, 140 is routed through "low" nodes 114, 124 of high/low switches 110, 120 to nodes 154, 164 of I/O ports 150, 160, respectively.

Referring now to FIGS. 5A through 5E, in order to simplify the description of the operation of the present invention, only one motor 18a and its corresponding wiper 14a is illustrated and described in the following example. As should be apparent from the foregoing, the operation and configuration of motor 18b and its corresponding wiper 14b is identical to that depicted in FIGS. 5A through 5E. Vbat power at node 154 of I/O port 150 provides Vbat power to low input 32 of armature 26. Armature 26 drives linkage 16a, thereby causing wiper 14a to move off of the "park" position to begin a wipe cycle. As armature 26 rotates, parking disk 24 also rotates from the "park" position in the direction of the arrow shown in FIG. 5A. Initially, contact 42 is connected through the surface of main body 36 to contact 44. Accordingly, the "PARK" signal is initially at ground potential.

Figure 5A:
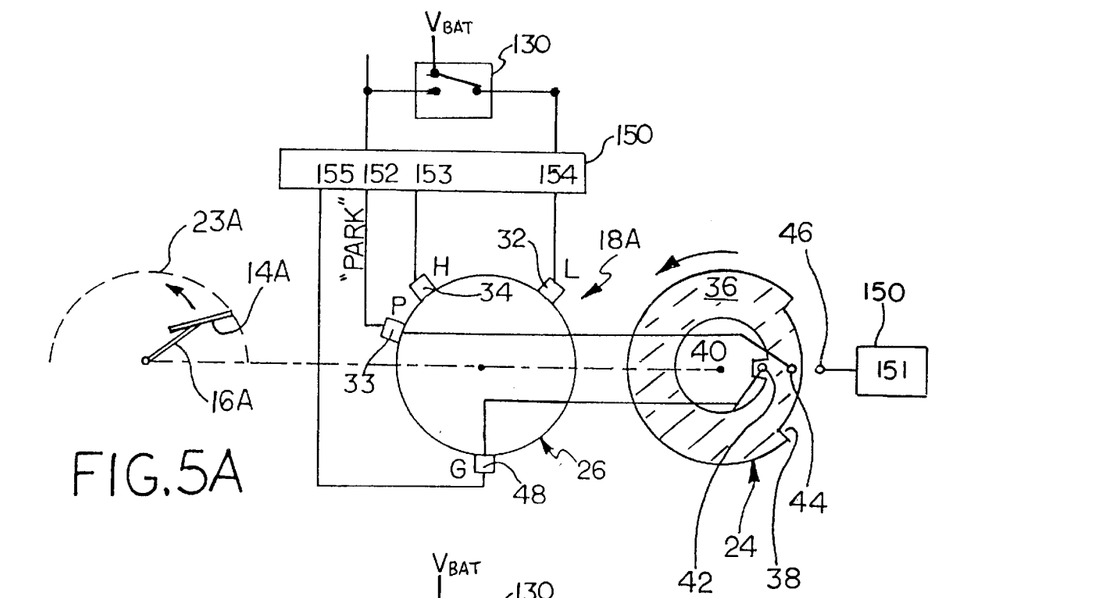
FIGS. 5A through 5E are graphical representations of the operation of a motor controlled by a synchronization system according to the present invention.
Figure 5B:
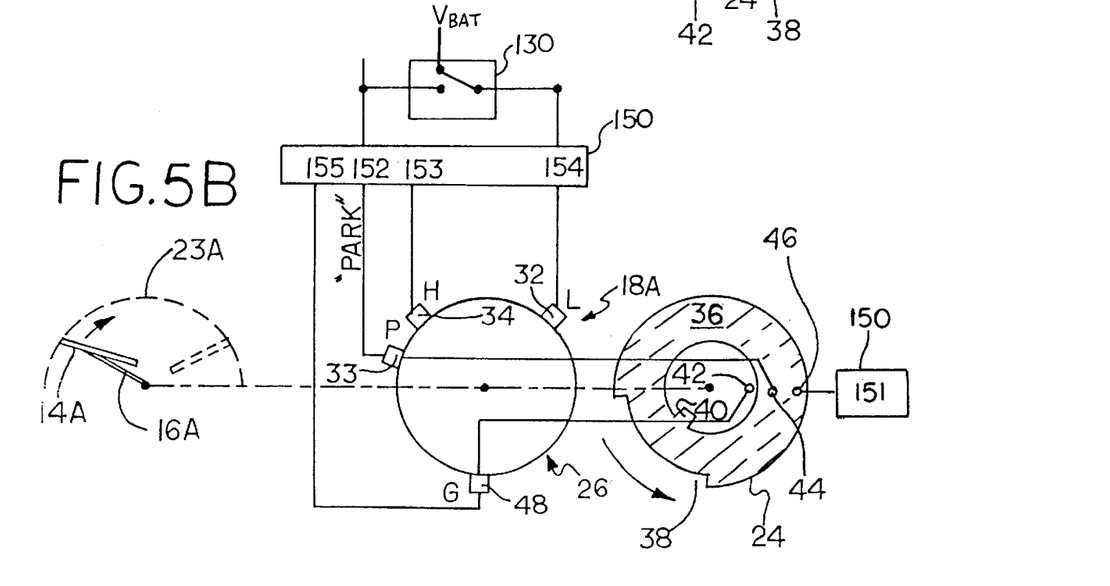

As shown in FIG. 5B, armature 26 continues to rotate linkage 16a and wiper 14a through the "reversal" position. This reversal in direction of linkage 16a and wiper 14a is accomplished mechanically according to principles well known in the art. As parking disk 24 rotates, contacts 44 and 46 are electrically connected through the surface of main body 36. Therefore, Vbat is present at node 152 of I/O port 150, and the "PARK" signal is at a logic high level.

Figure 5C:
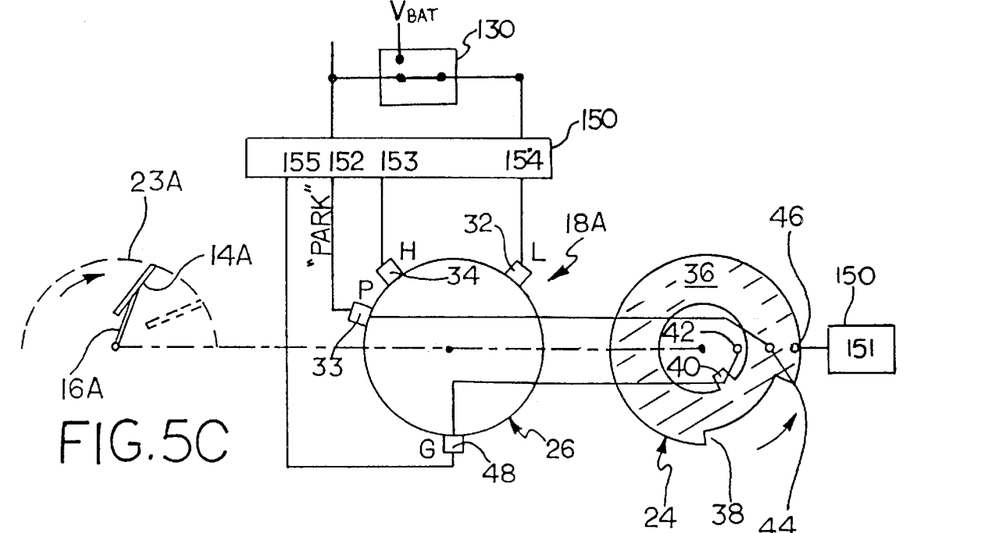

At some point in the wipe cycle, illustrated in FIG. 5C, the "RUN" signal from signal generator 80 transitions to a logic low level. The transition of the "RUN" signal corresponds to the time constant of the RC network consisting of resistor 81 and capacitor 84. When capacitor 84 discharges, the output of timer 82 (pin 3) transitions to a logic low level disabling drive transistor 86. This deactivates run/park switches 130, 140, causing the relays to switch into the "off" position. As a result, low input 32 is connected which is connected to Vbat through contacts 46 and 44 through high/low switch 110 and run/park switch 130 to "park" output 33. In this configuration, even after the "RUN" signal is no longer applied to motor 18a, parking disk 24 continues to rotate and the "PARK" signal remains at a logic high level because of the energy stored in motor 18a.

The mechanical, flywheel kinetic energy existing at the time power was removed from low input 32 of armature 26 also causes continued rotation of parking disk 24. Armature 26, however, quickly slows to a stop through a principle known as "dynamic breaking." As is known in the art, dynamic breaking occurs when a DC motor is configured to cause a breaking action at its output shaft as opposed to its normal output torque. This is accomplished by short circuiting (or applying a low resistance) across the armature terminals of a motor where input power is normally applied. This effectively converts the motor into a DC generator, its output power being consumed by the short circuit across the armature terminals. The mechanical, flywheel kinetic energy existing at the time the motor was switched off, under the shorting conditions, is used to coast the armature to a stop, producing shaft input torque to generate current. As such, the motor rotates to a quick stop, with limited coast.

Figure 5D:
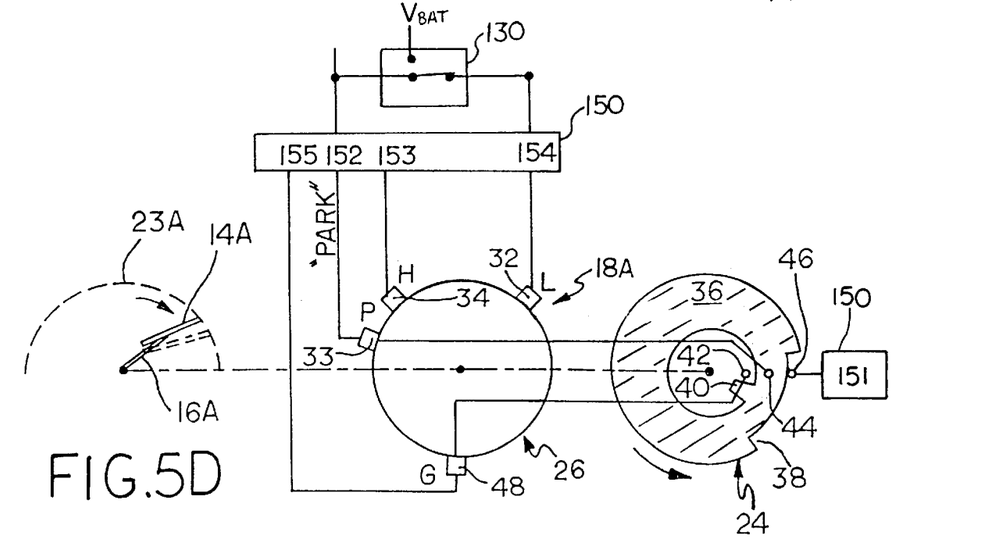

This is accomplished by the present invention when the run/park switches 130, 140 are switched into their "off" position when the "RUN" signal is removed. As shown in FIG. 5D, when the "RUN" signal is removed, run/park switch 130 connects node 154 of I/O port 150 (through high/low switch 110) to node 152 of I/O port 150. As such, even after parking disk 24 has rotated such that contact 46 is no longer in contact with the surface of main body 36 (as shown in FIG. 5D), the low input 32 of armature 26 is connected to the park output 33 of armature 26. In this configuration, low input 32 of armature 26 discharges energy through run/park switch 130. FIG. 5D shows motor 18a approaching the "park" position. Wiper 14a has nearly returned to the "park" position, and parking disk 24 has completed almost 360 degrees of rotation. At this point in the wipe cycle, contact 46 is aligned with notch 38 of parking disk 24. The "PARK" signal provided at "park" output is connected through run/park switch 130 to low input 32, and thus remains at a logic high.

Figure 5E:
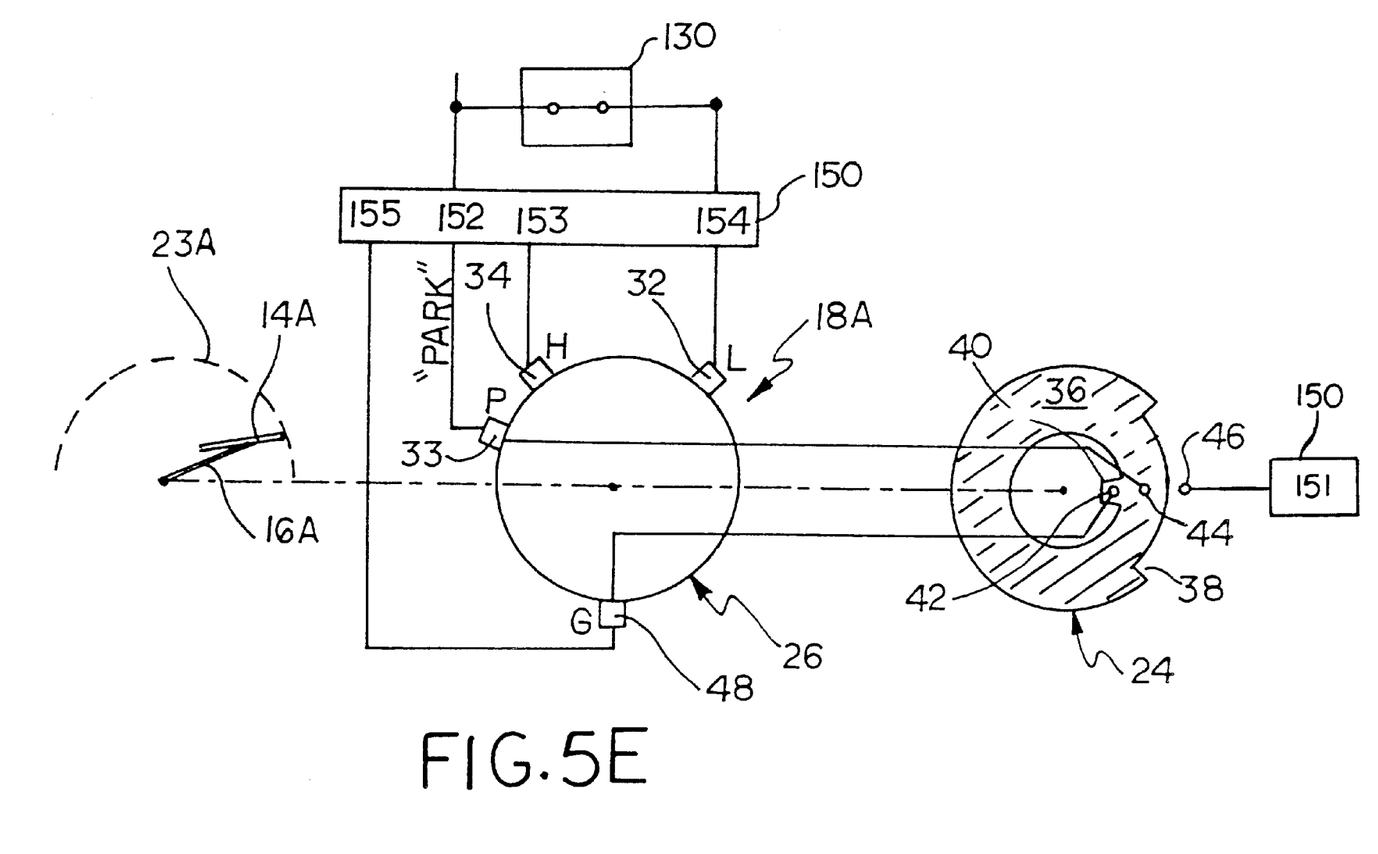

As armature 26 rotates further still, motor 18a returns to the "park" position as shown in FIG. 5E. Parking disk 24 rotates such that interior projection 40 aligns with contact 42. Accordingly, ground is connected through main body 36 from contact 42 to contact 44, thereby causing the "PARK" signal to transition to a logic low level, fully discharging any stored energy in armature 26 through low input 32. The logic low level "PARK" signal is routed through I/O port 150 at "park" node 152 to "off" node 134 of run/park switch 130. The signal is also routed to resistor 171 of gate circuit 170. This creates a logic low level at the input of NOR gate 179a.

When parking disk 24 rotates such that interior projection 40 aligns with contact 42, a short circuit is formed from low input 32 through node 154 of I/O port 150, to high/low relay 110, to run/park relay 130, to "park" node 152, through main body 36 of parking disk 24, to ground input 48. As described above, in addition to generating the "PARK" signal, this configuration of parking disk 24 provides for the full discharge of motor 18a (through low input 32) as a part of the system's dynamic breaking. Accordingly, the rotation of parking disk 24 abruptly stops upon reaching the orientation depicted in FIG. 5E.

For purposes of this description, assume that motor 18b has not yet completed its wipe cycle because, for example, debris on that side of windshield 25 has increased the friction encountered by wiper 14b, thereby slowing down its movement. Since thus "PARK" signal provided from motor 18b remains at a logic high level until parking disk 24 of motor 18b rotates into its "park" position, the "PARK" signal provided through I/O port 160 at "park" node 162 remains at a logic high level. This signal is applied through resistor 172 to the other input of "NOR" gate 179a. Since one input to "NOR" gate 179a is at a logic high level, the output is at a logic low level. This signal is inverted by "NOR" gate 179b and again inverted by "NOR" gate 179c. Accordingly, the trigger signal (i.e. the "SYNCH" signal) at the output of "NOR" gate 179c is at a logic low level. Transistor 178 is therefore disabled and signal generator 80 does not generate an additional "RUN" signal. Synchronizer 10 remains in this state until motor 18b reaches the "park" position.

When motor 18b reaches the "park" position, the "PARK" signal at "park" node 162 of I/O port 160 transitions to a logic low level. As explained above, this signal is applied to the input of "NOR" gate 179a. Under these conditions, both inputs to "NOR" gate 179a are at a logic low level, and the output of the gate is at a logic high level. If both inputs to gate 179a remain at a logic low level for a period of time corresponding to the time constant of dwell resistor 176b and dwell capacitor 176a, the "SYNCH" signal at the output of "NOR" gate 179c will transition to a logic high level, thereby enabling transistor 178. When transistor 178 conducts, capacitor 84 discharges to ground. This causes timer 82 of signal generator 80 to again generate a "RUN" signal, enabling drive transistor 86 and switching run/park switches 130, 140 into their "on" position. This commences an additional wipe cycle by again applying power to motors 18a, 18b through high/low switches 110, 120. Accordingly, desynchronized operation of wipers 14a, 14b persists, if at all, for only a portion of a single wipe cycle, and is substantially visually imperceptible. Each wipe cycle of wipers 14a, 14b begins in unison.

As should be apparent from the foregoing, the operation of synchronizer 10 is determined by the state of the position signals (in the above-described embodiments, the "PARK" signals) outputted by motors 18a, 18b or detected by position detectors 19a, 19b (FIG. 6). The position signals could be generated at any position in the wipe cycle by adjusting the orientation of parking disk 24 relative to linkages 16a, 16b. In other embodiments of the present invention, the position signals could be generated by microswitches or other position sensing devices mounted adjacent wipers 14a, 14b or linkages 16a, 16b at various positions other than the "park" position (depicted as position detectors 19a, 19b in FIG. 6). As each-wiper 14a, 14b or linkage 16a, 16b passes a microswitch or sensing device during the wipe cycle, the microswitch or sensing device generates a position signal equivalent to the "PARK" signal of the above-described embodiment, except possibly corresponding to a position other than the "park" position. Additionally, such microswitches or sensing devices could readily be positioned to provide an opposing arc or crossover wiper system. In such a system, the microswitches or sensing devices would be positioned to generate a position signal and begin a wipe cycle when, for example, wiper 14a is in the position shown in dotted lines in FIG. 1 and wiper 14b is in the position shown in solid lines in FIG. 1.

Synchronizer 10 may readily be modified or expanded to accommodate additional "PARK" signals as inputs to gate circuit 170. For example, four or five motors may be controlled by adding additional switches (relays in the above-described embodiment) and I/O ports. These motors may be synchronized by routing their output "PARK" signal to an AND gate. This AND gate could be configured to provide a "SYNCH" output signal to signal generator 80 only when all of the "PARK" signals are at the same polarity.

While this invention has been described as having exemplary embodiments, this application is intended to cover any variations, uses, or adaptions using its general principles. Further, this application is intended to cover such departures from the present disclosure as come within the known or customary practice within the art to which it pertains. The spirit and scope of the invention are to be limited only by the terms of the appended claims.

What is claimed is:

1. A windshield wiper control system comprising:
   a first motor connected to a first wiper,
   a first detector that generates a first position signal when the first wiper is in a predetermined position;
   a second motor connected to a second wiper,
   a second detector that generates a second position signal when the second wiper is in a predetermined position;
   a synchronizer connected to the first and second detectors, the synchronizer simultaneously enabling the first and second motors in response to the coexistence of both the first and second position signals, thereby initiating a wipe cycle only when the first wiper is in its predetermined position and the second wiper is in its predetermined position.

2. A system according to claim 1 further comprising a first switch connected between the synchronizer and the first motor and a second switch connected between the synchronizer and the second motor, the synchronizer simultaneously outputting a run signal to both the first and second switches in response to the coexistence of both the first and second position signals, the first and second switches enabling the first and second motors, respectively, upon receiving the run signal.

3. A system according to claim 2 wherein the run signal has a time duration less than a time duration of a wipe cycle.

4. A system according to claim 2 further comprising a gate circuit connected to the first and second detectors to receive the first and second position signals, the gate circuit outputting a trigger signal to the synchronizer upon receiving both the first and second position signals.

5. A system according to claim 4 wherein the gate circuit includes a logic gate connected to the first detector for receiving the first position signal, and the second detector for receiving the second position signal.

6. A system according to claim 5 wherein the logic gate is a NOR gate, the gate circuit including a first inverter and a second inverter cascaded with the logic gate, the first inverter being configured to invert the output of the logic gate, the second inverter being configured to invert the output of the first inverter.

7. A system according to claim 4 wherein the gate circuit includes a time delay circuit for preventing the generation of a trigger signal until after both the first and second position signals are present.

8. A system according to claim 2 wherein the first and second position signals are routed to the synchronizer through the first and second switches, respectively.

9. A system according to claim 1 wherein each of the first and second wipers remain in their respective predetermined positions at the end of each wipe cycle until after the other of the first and second wipers moves into its respective predetermined position, thereby initiating another wipe cycle.

10. A system according to claim 1 wherein the first wiper predetermined position is a first wiper park position and the second wiper predetermined position is a second wiper park position.

11. A system according to claim 1 wherein the first motor includes a first rotating disk which constitutes the first detector and the second motor includes a second rotating disk which constitutes the second detector.

12. A system according to claim 1 wherein the first and second motors have two or more speeds.

13. A system according to claim 1 wherein the first wiper is connected to the first motor by a first linkage and the second wiper is connected to the second motor by a second linkage.

14. A system according to claim 13 wherein the first detector is positioned adjacent the first linkage to detect the position of the first linkage and the second detector is positioned adjacent the second linkage to detect the position of the second linkage.

15. A system according to claim 1 wherein the synchronizer includes a signal generator having an output for outputting a run signal simultaneously to both the first and second motors to initiate a wipe cycle.

16. A system according to claim 15 wherein the signal generator outputs the run signal as a pulse having a duration.

17. A system according to claim 16 wherein the signal generator includes a timer including a resistor and a capacitor, the resistor and the capacitor controlling the run signal duration.

18. A system according to claim 15 further comprising a first switch connected between the signal generator and the first motor for enabling the first motor in response to the run signal and a second switch connected between the signal generator and the second motor for enabling the second motor in response to the run signal.

19. A system according to claim 18 wherein the signal generator includes a transistor connected between the signal generator output and the first and second switches, the transistor simultaneously activating the first and second switches in response to the run signal.

20. A system according to claim 18 further comprising a third switch connected between the first switch and the first motor for switching the first motor between a first and second speed of operation in response to an output from the first switch, and a fourth switch connected between the second switch and the second motor for switching the second motor between the first and second speed of operation in response to an output from the second switch.

21. A system according to claim 20 wherein the first and second position signals are routed to the synchronizer through the first and second switches, respectively, the first and third switches connecting the first position signal to a power input of the first motor when the run signal is not present, the second and fourth switches connecting the second position signal to a power input of the second motor when the run signal is not present.

22. A system according to claim 1 further comprising a function selector switch connected to the first and second motors for controlling the speed of operation of the motors.

23. A system according to claim 22 further comprising a third switch connected between the function selector switch and the first motor to switch the first motor between a first and second speed of operation, and a fourth switch connected between the function selector switch and the second motor to switch the second motor between a first and second speed of operation.

24. A system according to claim 1 further comprising an intermittent time select circuit connected to the synchronizer for providing intermittent operation of the first and second motors.

25. A system according to claim 1 wherein the synchronizer is configured to operate in either an astable mode or a monostable mode.

26. A system according to claim 1 further comprising a regulator circuit including a voltage regulator for maintaining voltage from a power source at a relatively constant level.

27. A system according to claim 26 wherein the regulator circuit includes a protection circuit for preventing energy spikes from entering the regulator circuit.

28. A system according to claim 1 wherein the first wiper predetermined position relative to a beginning position of the first wiper in the wipe cycle is substantially the same as the second wiper predetermined position relative to a beginning position of the second wiper in the wipe cycle.

29. A system according to claim 1 wherein the first motor includes a first detector including a rotating disk mounted to the motor and the second motor includes a second detector including a rotating disk mounted to the motor.

30. A system for simultaneously enabling a first and a second motor connected to a pair of windshield wipers thereby synchronizing the movement of the windshield wipers, each of the first and second motors generating a position signal when its respective windshield wiper is in a predetermined position, the system comprising:
   a gate circuit having inputs to receive the position signals, the gate circuit generating a trigger signal when the position signals coexist; and
   a signal generator connected to the gate circuit, the signal generator outputting a run signal upon receipt of the trigger signal to simultaneously enable the pair of motors, thereby initiating a synchronized wipe cycle.

31. A system according to claim 30 further comprising a first switch connected between the signal generator and the first motor and a second switch connected between the signal generator and the second motor, the signal generator simultaneously outputting a run signal to both the first and second switches upon receiving the trigger signal, the first and second switches simultaneously enabling the first and second motors upon receiving the run signal.

32. A system according to claim 31 wherein the run signal has a time duration less than the time duration of a wipe cycle.

33. A system according to claim 31 wherein the first and second switches are connected to the gate circuit, the position signals being routed to the gate circuit through the first and second switches.

34. A system according to claim 31 wherein the first motor position signal is routed to the signal generator through the first switch and the second motor position signal is routed to the signal generator through the second switch.

35. A system according to claim 34 wherein the first switch connects the first motor position signal to a power input of the first motor and the second switch connects the second motor position switch to a power input of the second motor.

36. A system according to claim 34 wherein the run signal has a time duration which is less than the time required for the first and second motors to move through their respective cycles.

37. A system according to claim 30 wherein the first one of the pair of windshield wipers that moves into its predetermined position at the end of a wipe cycle remains in its predetermined position until after the other of the pair of windshield wipers moves into its predetermined position.

38. A system according to claim 30 wherein the predetermined positions are windshield wiper park positions.

39. A system according to claim 30 wherein the gate circuit includes a logic gate having an output, a first input connected to the first motor for receiving the first motor position signal, and a second input connected to the second motor for receiving the second motor position signal.

40. A system according to claim 39 wherein the gate circuit further includes a first and second inverter cascaded with the logic gate, the first inverter being configured to invert the output of the logic gate, the second inverter being configured to invert the output of the first inverter.

41. A system according to claim 30 wherein the gate circuit includes a capacitor for preventing the generation of a trigger signal until after both the first and the second motors have generated their respective position signals for a predetermined dwell time.

42. A system according to claim 30 wherein the signal generator includes a timer having an output for outputting a run signal.

43. A system according to claim 42 wherein the run signal is a pulse having a duration.

44. A system according to claim 42 further comprising a first switch connected between the signal generator and the first motor for enabling the first motor in response to the run signal and a second switch connected between the signal generator and the second motor for enabling the second motor in response to the run signal.

45. A system according to claim 44 wherein the signal generator includes a transistor connected between the timer output and the first and second switches, the transistor simultaneously activating the first and second switches in response to the run signal.

46. A system according to claim 30 further comprising a function selector switch connected to the first and second motors for controlling the speed of operation of the motors.

47. A system according to claim 46 further comprising a third switch connected between the function selector switch and the first motor and a fourth switch connected between the function selector switch and the second motor.

48. A system according to claim 30 further comprising an intermittent time select circuit connected to the signal generator for providing intermittent operation of the first and second motors.

49. A system according to claim 30 wherein the signal generator operates in either an astable mode or a monostable mode.

50. A system according to claim 30 further comprising a regulator circuit including a voltage regulator for maintaining voltage from a power source at a relatively constant level.

51. A system according to claim 50 wherein the regulator circuit includes a protection circuit for preventing energy spikes from entering the regulator circuit.

52. A system according to claim 30 wherein the predetermined position of the windshield wiper connected to the first motor relative to a beginning position in the wipe cycle of the first motor is substantially the same as the predetermined position of the windshield wiper connected to the second motor relative to a beginning position in the wipe cycle of the second motor.

53. A synchronization system comprising:
   a first motor which moves when enabled through a cycle from a starting position to a second position and back to the starting position, the first motor causing a first position signal when in a first predetermined position;
   a second motor which moves when enabled through a cycle from a starting position to a second position and back to the starting position, the second motor causing a second position signal when in a second predetermined position; and
   a signal generator connected to the first and the second motors, the signal generator simultaneously enabling the first and second motors to move through their respective cycles in response to the coexistence of both the first and second position signals.

54. A system according to claim 53 further comprising a gate circuit connected to the first and second motors for receiving the first and second position signals, the gate circuit simultaneously outputting a trigger signal to the signal generator upon simultaneous receipt of the first and second position signals, thereby causing the signal generator to enable the first and second motors.

55. A system according to claim 54 further comprising a first switch connected between the signal generator and the first motor and a second switch connected between the signal generator and the second motor, the signal generator simultaneously outputting a run signal to the first and second switches upon receiving the trigger signal, the first and second switches enabling the first and second motors to move through their respective cycles upon receiving the run signal.

56. A system according to claim 55 wherein the first and second switches are connected to the gate circuit, the first and second position signals being generated by the first and second motors, respectively, the first and second position signals being routed to the gate circuit through the first and second switches, respectively.

57. A system according to claim 54 wherein the gate circuit includes a logic gate.

58. A system according to claim 54 wherein the gate circuit includes a first NOR gate having an output, a first input connected to the first motor for receiving the first position signal, and a second input connected to the second motor for receiving the second position signal.

59. A system according to claim 54 wherein the gate circuit includes a capacitor for preventing the generation of a trigger signal until after both the first and the second motors have caused their respective position signals for a predetermined dwell time.

60. A system according to claim 53 wherein each of the first and second motors includes a position feedback device in the form of a rotating disk.

61. A system according to claim 53 wherein the first and second motors are controllable for operation at two or more speeds.

62. A system according to claim 53 wherein the signal generator includes a timer having an output for outputting a run signal.

63. A system according to claim 62 wherein the run signal is a pulse having a duration.

64. A system according to claim 62 wherein the timer is connected to a resistor and a capacitor, the resistor and the capacitor controlling the run signal duration.

65. A system according to claim 62 further comprising a first switch connected between the signal generator and the first motor for enabling the first motor and a second switch connected between the signal generator and the second motor for enabling the second motor.

66. A system according to claim 65 wherein the signal generator includes a transistor connected between the timer output and the first and second switches, the transistor simultaneously activating the first and second switches in response to the run signal.

67. A system according to claim 53 further comprising a function selector switch connected to the first and second motors for controlling the speed of operation of the motors.

68. A system according to claim 67 further comprising a third switch connected between the function selector switch and the first motor for switching the first motor between two speeds of operation and a fourth switch connected between the function selector switch and the second motor for switching the second motor between two speeds of operation.

69. A system according to claim 53 further comprising an intermittent time select circuit connected to the signal generator for providing intermittent operation of the first and second motors.

70. A system according to claim 53 wherein the signal generator operates in either an astable mode or a monostable mode.

71. A system according to claim 53 further comprising a regulator circuit including a voltage regulator for maintaining voltage from a power source at a relatively constant level.

72. A system according to claim 71 wherein the regulator circuit includes a protection circuit for preventing energy spikes from entering the regulator circuit.

73. A system according to claim 53 wherein the first predetermined position within the cycle relative to the first motor starting position is substantially the same as the second predetermined position within the cycle relative to the second motor starting position.

74. A windshield wiper control system comprising:

first motor means for moving a first wiper, the first motor means generating a first position signal when the first wiper is in a predetermined position;

second motor means for moving a second wiper, the second motor means generating a second position signal when the second wiper is in a predetermined position;

gate circuit means connected to the first motor means and the second motor mens for receiving the first and second position signals, the gate circuit means generating a trigger signal upon the coexistence of both the first and second position signals;

signal generator means connected between the gate circuit means and the first and second motor means for simultaneously enabling the first and second motor means upon receiving the trigger signal thereby initiating a wipe cycle only when the first wiper is in its predetermined position and the second wiper is in its predetermined position; and switch means connected to the first and second motor means for controlling the speed of operation of the first and second motor means.

75. A windshield wiper control system comprising:

a first motor connected to a first wiper;

a first detector that generates a first position signal when the first wiper is in a predetermined position;

a second motor connected to a second wiper;

a second detector that generates a second position signal when the second wiper is in a predetermined position;

a synchronizer connected to the first and second detectors, the synchronizer enabling the first and second motors in response to the presence of both the first and second position signals, thereby initiating a wipe cycle only when the first wiper is in its predetermined position and the second wiper is in its predetermined position;

a first switch connected between the synchronizer and the first motor and a second switch connected between the synchronizer and the second motor, the synchronizer outputting a run signal to the first and second switches in response to the presence of both the first and second position signals, the first and second switches enabling the first and second motors, respectively, upon receiving the run signal; and a gate circuit connected to the first and second detectors to receive the first and second position signals, the gate circuit outputting a trigger signal to the synchronizer upon receiving both the first and second position signals;

the gate circuit including a logic gate connected to the first detector for receiving the first position signal, and the second detector for receiving the second position signal;

the logic gate being a NOR gate, the gate circuit including a first invertor and a second invertor cascaded with the logic gate, the first invertor being configured to invert the output of the logic gate, the second invertor being configured to invert the output of the first inverter.

76. A system according to claim 75 wherein the gate circuit includes a time delay circuit for preventing the generation of a trigger signal until after both the first and second position signals are present for a predetermined period of time.

77. A synchronizer system comprising:

a first motor which moves when enabled through a cycle from a starting position to a second position and back to the starting position, the first motor causing a first position signal when in a first predetermined position;

a second motor which moves when enabled through a cycle from a starting position to a second position and back to the starting position, the second motor causing a second position signal when in a second predetermined position;

a signal generator connected to the first and the second motors, the signal generator enabling the first and second motors to move through their respective cycles in response to the simultaneous presence of both the first and second position signals; and a gate circuit connected to the first and second motors for receiving the first and second position signals, the gate circuit outputting a trigger signal to the signal generator upon simultaneous receipt of the first and second position signals, thereby causing the signal generator to enable the first and second motors;

the gate circuit including a first NOR gate having an output, a first input connected to the first motor for receiving the first position signal, and a second input connected to the second motor for receiving the second position signal.

78. A system according to claim 77 wherein the gate circuit includes a second and a third NOR gate cascaded with the first NOR gate, the second NOR gate being configured to invert the output of the first NOR gate, the third NOR gate being configured to invert the output of the second NOR gate.

* * * * *

UNITED STATES PATENT AND TRADEMARK OFFICE
CERTIFICATE OF CORRECTION

PATENT NO. : 6,147,466
DATED : November 14, 2000
INVENTOR(S) : Steven J. Stronczek

It is certified that error appears in the above-identified patent and that said Letters Patent are hereby corrected as shown below:

Applicant hereby requests a Certificate of Correction in accordance with 37 C.F.R. 1.323 to Claim 74, Page 16, Line 33 - "mens" should be - - means- -.

Signed and Sealed this

First Day of May, 2001

Attest:

NICHOLAS P. GODICI

Attesting Officer        Acting Director of the United States Patent and Trademark Office